(12) United States Patent
Fechner et al.

(10) Patent No.: US 7,491,668 B2
(45) Date of Patent: *Feb. 17, 2009

(54) UV-RADIATION ABSORBING GLASS WITH HIGH CHEMICAL RESISTANCE, ESPECIALLY FOR A FLUORESCENT LAMP, AND METHODS OF MAKING AND USING SAME

(75) Inventors: Joerg Fechner, Mainz (DE); Franz Ott, Mitterteich (DE); Brigitte Hueber, Weiden (DE)

(73) Assignee: Schott AG, Mainz (DE)

( * ) Notice: Subject to any disclaimer, the term of this patent is extended or adjusted under 35 U.S.C. 154(b) by 326 days.

This patent is subject to a terminal disclaimer.

(21) Appl. No.: 10/861,823

(22) Filed: Jun. 4, 2004

(65) Prior Publication Data
US 2004/0266603 A1 Dec. 30, 2004

(30) Foreign Application Priority Data
Jun. 6, 2003 (DE) .............................. 103 25 745

(51) Int. Cl.
  *C03C 3/091* (2006.01)
  *C03C 3/093* (2006.01)
(52) U.S. Cl. .......................................... 501/66; 501/67
(58) Field of Classification Search .................. 501/66, 501/67, 68, 69, 70, 72
See application file for complete search history.

(56) References Cited

U.S. PATENT DOCUMENTS

| 4,565,791 | A | * | 1/1986 | Boudot et al. ................. 501/56 |
| 5,064,461 | A | * | 11/1991 | Morena et al. ............... 65/33.3 |
| 5,219,801 | A | * | 6/1993 | Shorrock et al. ............... 501/65 |
| 5,447,891 | A | * | 9/1995 | Spinosa et al. ................. 501/16 |
| 5,459,110 | A | * | 10/1995 | Brix ............................. 501/67 |
| 5,612,262 | A | * | 3/1997 | Kloss et al. .................... 501/65 |
| 5,747,399 | A |   | 5/1998 | Kosokabe et al. |
| 6,204,212 | B1 |   | 3/2001 | Kunert et al. |
| 6,635,592 | B1 | * | 10/2003 | Kosokabe et al. ............. 501/14 |
| 2003/0087745 | A1 | * | 5/2003 | Peuchert et al. ............... 501/66 |
| 2003/0232169 | A1 | * | 12/2003 | Kawai ........................ 428/66.6 |
| 2004/0176237 | A1 | * | 9/2004 | Ott et al. ....................... 501/66 |
| 2005/0151116 | A1 | * | 7/2005 | Fechner et al. ........... 252/186.1 |

FOREIGN PATENT DOCUMENTS

| DE | 198 42 942 A1 | 4/2000 |
| JP | 08012369 A | * 1/1996 |
| JP | 2002293571 A | * 10/2002 |

OTHER PUBLICATIONS

Patent Abstract of Japan 08012369 A, Jan. 16, 1996.
Patent Abstracts of Japan 2002293571, Oct. 9, 2002.
Technology of Glass Edited by Northwest Institute of Light Industry, Published by China Light Indystry Press,(Jan. 1982.).

* cited by examiner

*Primary Examiner*—David M Brunsman
(74) *Attorney, Agent, or Firm*—Michael J. Striker (57) ABSTRACT

The chemically resistant borosilicate glass has the following composition (in % by weight): $SiO_2$, 67-74; $B_2O_3$, 5-10; $Al_2O_3$, 3-10; $Li_2O$, 0-4; $Na_2O$, 0-10; $K_2O$, 0-10; MgO, 0-2; CaO, 0-3; SrO, 0-3; BaO, 0-3; ZnO, 0-3; $ZrO_2$, 0-3; $CeO_2$, 0-1; with $\Sigma Li_2O+Na_2O+K_2O=0.5$ to 10.5 and $\Sigma MgO+CaO+SrO+BaO+ZnO=0-6$. The borosilicate glass is characterized by a composition including 0 to 10% of at least one of $TiO_2$, $Bi_2O_3$ and $MoO_3$ and a sum total of $TiO_2+Bi_2O_3+MoO_3$ of 0.1 to 10%. This glass is obtained from the melt under oxidative conditions. The glass is useful in gas discharge lamps, such as Xenon lamps and fluorescent lamps, and display devices, flat structured backlighting devices, and glass-to-metal seals with Mo, Wo and Ni—Fe—Co alloys.

21 Claims, 2 Drawing Sheets

UV-RADIATION ABSORBING GLASS WITH HIGH CHEMICAL RESISTANCE, ESPECIALLY FOR A FLUORESCENT LAMP, AND METHODS OF MAKING AND USING SAME

BACKGROUND OF THE INVENTION

1. Field of the Invention

The present invention relates to a borosilicate glass with a steep UV absorption limit or edge, which has an outstanding hydrolytic resistance and is sufficiently fusible with metals or alloys, to a method of making it and to a method of use of this borosilicate glass.

2. Description of the Related Art

Glasses with great hydrolytic resistance are already known. This type of glass is especially useful for glass-metal seals, which for example are useful in chemically corrosive environments, such as chemical plants or reactor structures. These glasses have a thermal expansion coefficient, $\alpha_{20/300}$, between 4.3 and $5.7*10^{-6}$/K. They are thus especially suitable for sealing with Fe—Co—Ni alloys, for example the so-called KOVAR alloys, and with molybdenum. The thermal expansion coefficient, $\alpha_{20/300}$, for tungsten amounts to from 3.4 to $4.3*10^{-6}$/K.

Glasses with strong UV-absorbing properties are known. For example those glasses find use in gas discharge lamps and often block UV radiation up to about 260 nm (layer thickness of 0.2 mm). This sort of gas discharge lamp produces a large fraction of UV light, which can damage neighboring components, as well as visible light. Especially those components, which contain polymers and plastic, are made brittle by this UV radiation during long-term usage, which can render the entire product unusable. For example, it has been shown that mercury produces an especially damaging emission line at 318 nm. It is the purpose of this type of lamp glass to prevent this especially damaging emission line from passing through it and to absorb it as completely as possible.

It has been shown that this sort of glass indeed has a significant absorption of visible light in a range under 1000 nm, which is disadvantageous from many applications. Also gas discharge tubes, such as fluorescent lights, which are used for liquid crystal displays (LCDs), especially of backside-illuminated displays, so-called backlight displays, have this disadvantage. Although this sort of fluorescent light has only very small dimensions and thus only has extremely thin lamp glass, a quality or grade loss occurs in spite of that, which has proven disadvantageous in qualitatively high-grade displays, such as electronic display units and computer screens, for example for laptops or mobile telephones.

Furthermore glasses in this sort of application should have a comparatively constant permeability and/or transmission, particularly for visible light up to a wavelength range of under 400 nm, especially under 380 nm, which then steeply drops.

Moreover it has been shown that this sort of fluorescent lamp glass has only a small hydrolytic resistance of class 3 according to ISO 719. This hydrolytic resistance is not sufficiently suitable for many products for processing this sort of glass and its use as lighting means.

Furthermore it is required that a glass especially for this sort of application must have certain definite physically properties, such as CTE, Tg, VA, which are required for sealing with metals, such as tungsten and molybdenum, and metal alloys, such as KOVAR. For example, a CTE of 4.3 to $5.5*10^{-6}$/K (30-380° C.) is required for KOVAR, a CTE of 4.4 to $5.1*10^{-6}$/K (30-380° C.) is required for molybdenum and a CTE of 3.4 to $4.3*10^{-6}$/K (30-380° C.) is required for tungsten. The glass temperature Tg is preferably from 470° C. to 540° C. Attempts are made to provide glasses of this sort with a hydrolytic resistance of at least class 2, preferably class 1 according to ISO 719.

Zirconium oxide-containing and lithium oxide-containing borosilicate glasses with high chemical resistance, which have a high hydrolytic resistance, a high acid resistance and a high alkali resistance and which are especially suitable for laboratory applications, for chemical plants and pharmaceutical packaging as well as mantel glass fibers, are known from DE-A 198 42 942. Furthermore this sort of glass is especially suitable for glass-metal seals.

The borosilicate glass for discharge lamps described in JP-A 8-12369 contains total amounts of from 0.03 to 3 percent by weight of at least two of four ingredients: $V_2O_5$, $Fe_2O_3$, $TiO_2$ and $CeO_2$ for UV blocking. High transmission and high solarization resistances are not adjustable with these ingredients with high individual ingredient amounts and their combinations. Many of these glasses have a noticeable discoloration during sealing or melting.

U.S. Pat. No. 5,747,399 discloses a glass for miniaturized fluorescent lamps, which have solarization stability and UV-impermeability because of $TiO_2$ and/or PbO and/or $Sb_2O_3$. However amount of $TiO_2$, especially high amounts, lead to coloration of the glass. Also PbO should be avoided due to environmental problems.

Furthermore fluorescent lamp glasses are known from U.S. Pat. No. 5,747,399 for the above-described applications, which absorb UV-radiation in the desired amounts. However it has been shown that this sort of glass exhibits a strong solarization and a strong discoloration in the visible range.

Moreover a lamp glass for a fluorescent lamp is known from JP-A 2002 293 571, which is especially suitable for illumination of liquid crystal displays.

A zirconium oxide-containing and lithium oxide-containing borosilicate glass of high resistance is known from DE-A 198 42 942, which is especially suitable for use as sealing glass for sealing with Fe—Co—Ni alloys. This sort of glass can also contained colored ingredients, such as $Fe_2O_3$, $Cr_2O_3$, CoO and $TiO_2$.

In U.S. Pat. No. 4,565,791 A glass is described for ophthalmologic applications, which has a special index of refraction and Abbé number, and a suitable density for that application. This sort of glass has a UV absorption limit or edge between 310 nm and 335 nm and contains $TiO_2$ as UV absorber. For manufacture of this glass this reference expressly teaches that refining with chlorine is required, since refining with $As_2O_3$ and with $Sb_2O_3$ is not sufficient. Finally the reference teaches that although these glasses are extremely thin, a combination of $Fe_2O_3$ and $TiO_2$ leads to a discoloration of the glass so that quartz raw material should be used exclusively with an iron content of less than 100 ppm.

It has also been shown that this sort of glass has the above-described disadvantages of the state of the art, such as strong solarization, discoloration and absorption in the visible wavelength range.

SUMMARY OF THE INVENTION

It is an object of the present invention to provide a glass, which does not have the above-described disadvantages and which has a stable hydrolytic resistance, which strongly blocks UV radiation, however which has a high transmission in the visible range and which is especially suitable for glass-metal seals with common metals and/or alloys, especially chemically highly resistant metals and alloys.

It is also an object of the present invention to provide a glass with as sharp as possible a UV absorption edge or limit, which means that the transmission should drop to 0 as rapidly as possible at a desired wavelength within less than a nanometer. The less the spacing between the maximum transmission and the maximum absorption, the steeper and/or sharper is the absorption limit or edge.

These objects are attained by a glass defined in the claims appended below, and by the methods for making it and using it.

The borosilicate glass according to the invention, which attains the above-described objects, has the following composition:

| | |
|---|---|
| $SiO_2$ | 67-74% by weight |
| $B_2O_3$ | 5-10% by weight |
| $Al_2O_3$ | 3-10% by weight |
| $Li_2O$ | 0-4% by weight |
| $Na_2O$ | 0-10% by weight |
| $K_2O$ | 0-10% by weight, |
| wherein $\Sigma\ Li_2O + Na_2O + K_2O$ | 0.5-10.5% by weight, |
| MgO | 0-2% by weight |
| CaO | 0-3% by weight |
| SrO | 0-3% by weight |
| BaO | 0-3% by weight |
| ZnO | 0-3% by weight, |
| wherein $\Sigma$ MgO + CaO + SrO + BaO + ZnO | 0-6% by weight, |
| $ZrO_2$ | 0-3% by weight |
| $CeO_2$ | 0-1% by weight |
| $TiO_2$ | 0-10% by weight |
| $Bi_2O_3$ | 0-10% by weight |
| $MoO_3$ | 0-10% by weight, |
| wherein $\Sigma\ TiO_2 + Bi_2O_3 + MoO_3$ | 0.1-10% by weight, | wherein the borosilicate glass has a $NO_3$ residual content after refining of up to 0.01 wt. %. The titanium present in the glass according to the invention is at least 80% by weight, preferably at least 90% by weight, in the $Ti^{4+}$ oxidation state.

It was namely found that a glass of this sort not only has the desired hydrolytic resistance of at least class 2 according to ISO 719, but surprisingly this sort of glass has a sharp UV absorption edge or limit, whose position may be shifted to a higher or lower wavelength as needed without producing a substantial discoloration and/or solarization in the visible range, when the refining is substantially free of chloride and free of $Sb_2O_3$. It was found that blue coloration of the glass, like occurs especially during use of $TiO_2$, can be avoided when chloride is not used as a refining agent.

It has been shown surprisingly that sulfates, which e.g. are used as refining agents, like the above-described agents, lead to a discoloration in the glass. According to the invention preferably sulfate is also avoided.

It has been shown that color-forming faults and defects formed by color-forming and solarization in the glass matrix are avoided or at least greatly reduced with the procedure according to the invention. The object of the invention is attained by refining with $As_2O_3$ under oxidizing conditions, and of course especially when $TiO_2$ is added together with $Fe_2O_3$ to adjust the UV absorption edge or limit. According to the invention it was found that the above-described advantages may be avoided when at least 80%, preferably at least 90%, especially preferably at least 95% and most preferably at least 99% of the titanium in the $TiO_2$ in the glass or melt is in the +4 oxidation state. Especially preferably 99.9%, even more preferably 99.99%, of the titanium present is $Ti^{+4}$. In a few cases it has proven significant that 99.999% of the titanium present is present as $Ti^{+4}$. The term "oxidative conditions" means those conditions under which $Ti^{+4}$ is in the above-described amounts or is oxidized to it. These types of oxidation conditions may be easily achieved according to the invention in the melt, for example by addition of nitrates, especially alkali and/or alkaline earth nitrates. The use of $SO_3$ and alkali and alkaline earth sulfates according to the invention is to be avoided. The nitrate itself is used in the method according to the invention in an amount of at least 0.3 Mol %, preferably 1 Mol %. A maximum amount of 6 Mol % and especially a maximum amount of 5 Mol % is preferred.

The glass according to the invention is made by making a melt from conventional starting materials, in which alkali oxides, such as Na, K and Li, and especially carbonates and preferably at least partially nitrates are added. Also alkaline earth oxides can be used in the method according to the invention as nitrates either alone or together with alkali nitrates as oxidizing starting materials. The use of halides and of $Sb_2O_3$ and/or sulfates is preferably avoided in the method according to the invention. The glass is melted in a known way from its raw materials and preferably refined by means of $As_2O_3$. The method according to the invention is preferably performed without $Sb_2O_3$ as refining agent and the glass is preferably free of it. The maximum content of alkali and/or alkaline earth oxides added as nitrates amounts to 8 percent by weight, preferably at most 6 percent by weight and especially preferably 2 percent by weight, however at least 0.1% by weight and at least 0.5 percent by weight is preferred.

The refining agent $As_2O_3$ is employed in the method according to the invention in an amount of at least 0.01 percent by weight, preferably at least 0.05 percent by weight and especially preferably at least 0.1% percent by weight. The usual maximum amount employed is at most 2 percent by weight, especially 1.5 percent by weight, and preferably 1 percent by weight. An amount of 0.8 percent by weight is particularly preferred.

The content of $TiO_2$, by which the strength and sharpness and position of the UV absorption edge or limit is adjustable, amounts to preferably at least 0.05 percent by weight, usually at least 0.1 percent by weight but at least 0.5% by weight is especially preferred. In most cases the minimum amount of 1 percent by weight, and/or 2 percent by weight has proven to be suitable. Minimum amounts of 0.5 to a maximum of 3 percent by weight, preferably minimum amounts of 0.7 to maximum amounts of 2 percent by weight, have proven suitable for blocking up to at least 260 nm. To obtain blocking at 320 nm amounts of at least 4 percent by weight, preferably at least 4.5 percent by weight, have proven to be sufficient. The usual maximum amount of $TiO_2$ for this wavelength range amounts to 6 percent by weight, preferably 5.5 percent by weight. The maximum amount of $TiO_2$ amounts to 12% by weight, usually 10% by weight, but 8% by weight is especially preferred.

According to the invention it has been found that $Fe_2O_3$ may be used to still further adjust the UV absorption edge or limit in a synergistic way. Although it is known that $Fe_2O_3$ leads to a discoloration of the base glass and thus to an undesirable absorption of visible wavelengths, it has now been found that the glass is not discolored in the visible range or at most in a non-interfering manner, when it, as already described, is oxidatively refined in the glass composition according to the invention. In this way it is now possible according to the invention to limit the $TiO_2$ content in the glass. It has also been shown that the $TiO_2$ dissolved in the base matrix separates into two phases, especially at higher titanium content during slow cooling and/or renewed heating, for example, in processing, especially at higher titanium concentration, which leads to a Tyndall effect, which scatters light. This effect and thus the inherent reduction of $TiO_2$ can now be avoided by addition of $Fe_2O_3$ to the base glass under oxidative conditions. The amount of $Fe_2O_3$ in the glass preferably amounts to at least 50 ppm, especially at least 100 ppm. A minimum content of 120 and/or 140 ppm is preferred. However typical minimum amounts of $Fe_2O_3$ amount to 150 ppm and especially 200 ppm. The upper limit of the $Fe_2O_3$ amount is determined by the desired adjustment of the UV absorption edge or limit and thus the UV absorption behavior. However suitable appropriate upper limits of at most 1500 ppm and especially 1200 ppm have proven to be appropriate. An upper limit of 1000 ppm has proven to be especially suitable. Upper limits of 800 ppm and especially 500 ppm have proven to be entirely suitable. In many cases a maximum content of 400 ppm is sufficient. According to the invention it has been shown that the UV absorption edge or limit is shiftable by about 2 to 8 nm to higher wavelengths by addition of about 100 ppm of $Fe_2O_3$.

In the case in which $Fe_2O_3$ is present it has been shown that a minimum amount of $TiO_2$ of 0.5 percent by weight and especially of 0.7 and/or 0.8 percent by weight are sufficient. The upper limit for the $Fe_2O_3$ present amounts to 4.5 percent by weight, especially 4 percent by weight, but 3.5 percent by weight is preferred. In many cases an upper limit of 3 percent by weight, especially of 2.8 percent by weight and even of 2.5 percent by weight, has proven completely satisfactory.

The base glass according to the invention contains at least 67 percent by weight of $SiO_2$. At least 67.5% by weight of $SiO_2$ and especially at least 68% by weight $SiO_2$ are especially preferred. The highest limit for $SiO_2$ amounts to 74% by weight, especially less than 73% by weight. At most 69% by weight of $SiO_2$ is most preferred. The amount of $B_2O_3$ in the glass according to the invention amounts to at least 5% by weight, especially at least 7 percent by weight. Minimum amounts of 9%, especially 9.5% by weight, are especially preferred. The maximum content of $B_2O_3$ amounts to about 10 percent by weight in the glass according to the invention but 9.95 percent by weight is preferred.

$Al_2O_3$ is contained in the glass according to the invention in an amount of at least 3 percent by weight, especially at least 5 percent by weight and preferably at least 5.5 percent by weight. The maximum amount of $Al_2O_3$ amounts to 10 percent by weight, especially 9 percent by weight and preferably 7 percent by weight and especially preferably 6.5 percent by weight.

$Li_2O$ is contained in the glass according to the invention in an amount of 0 to at most 4 percent by weight. Minimum amounts of 0.5 percent by weight and especially 1 percent by weight are preferred. An especially preferred minimum amount for $Li_2O$ amounts to 1.5 percent by weight. The maximum amount of $Li_2O$ amounts to 4 percent by weight, preferably 3 percent by weight. A preferred maximum amount of $Li_2O$ amounts to 2.5 percent by weight and especially 2.0 percent by weight. The content of $Na_2O$ and $K_2O$ amounts to from 0 to a maximum of 10 percent by weight in the glass according to the invention. However the upper limit for $Na_2O$ is preferably 5 percent by weight, especially preferably 4 percent by weight. The preferred minimum amount of $K_2O$ amounts to 0.5 percent by weight and the preferred maximum amounts to 8 percent by weight, especially 7 percent by weight. The sum of the alkali oxides $Li_2O$, $Na_2O$ and $K_2O$ in the glass according to the invention amounts to at least 0.5 percent by weight and at most to 10.5 percent by weight. Minimum total amounts of 1 percent by weight, especially of 2 percent by weight, and maximum total amounts of 10 percent by weight, especially 9 percent by weight and most especially 7 percent by weight are preferred.

The amounts of MgO, CaO, SrO, BaO and ZnO in the glass according to the invention are each, independently of each other, from 0 to 3 percent by weight. The maximum amount for MgO is usually 0.2 percent by weight. A preferred minimum amount of MgO and CaO in the glass according to the invention each amounts, independently of each other, to 0.5 percent by weight. The preferred maximum amounts of MgO and CaO are each, independently of each other, 2 percent by weight and preferably 1.5 percent by weight. The total content of the alkaline earth oxides MgO, CaO, SrO, BaO and the transition metal oxides ZnO amounts to 0 to 6 percent by weight. A minimum total content of the alkaline earth oxides MgO, CaO, SrO, BaO and the transition metal oxides ZnO of up to 4 percent by weight and especially 3% by weight is especially preferred. A maximum total content of the alkaline earth oxides MgO, CaO, SrO, BaO and the transition metal oxides ZnO of 2 percent by weight, especially 2.5 percent by weight and particular 1.2 percent by weight is preferred.

The glass according to the invention preferably contains from 0 to 3 percent by weight of $MoO_3$ and/or from 0 to 5 percent by weight of $Bi_2O_3$, independently of each other, addition to $TiO_2$. The sum of both oxides preferably amounts to 0.01 to 5 percent by weight. According to the invention $MoO_3$ and/or $Bi_2O_3$ alone or together can provide high UV blocking together with $TiO_2$. Generally higher contents of $MoO_3$ and/or $Bi_2O_3$ lead to coloration of the glass. A minimum amount for each of 0.1 percent by weight especially a minimum amount of 0.2 percent by weight, and a maximum amount of 3 percent by weight, for these metal oxides are preferred. A minimum amount of 0.4 percent by weight for $MoO_3$ or a minimum amount of 1.0 percent by weight for $Bi_2O_3$ is especially preferred. Also $Bi_2O_3$ improves the solarization stability of the glass. Especially a minimum content of $MoO_3$ of 0.6 percent by weight or a minimum content of $Bi_2O_3$ of 1.3 percent by weight is particularly preferred.

It has been shown that, although the glass according to the invention is very stable against solarization with UV radiation, its solarization stability can be further increased by small amounts of PdO, $PtO_3$, $PtO_2$, PtO, $RhO_2$, $Rh_2O_3$, $IrO_2$ and/or $Ir_2O_3$. The sum content of the above-described oxides have a maximum value of 0.1 percent by weight, preferably 0.01 percent by weight, especially preferably 0.001 percent by weight. The minimum content for this purpose usually amounts to 0.01 ppm, wherein at least 0.05 ppm and especially at least 0.1 ppm are preferred.

Although the glass according to the invention can contain small amounts of $CeO_2$, PbO and $Sb_2O_3$ to increase chemical resistance and processability, the glass according to the invention is preferably free of these ingredients. In so far as it contains iron, it is converted during the melting to its +3 oxidation state during oxidizing conditions and thus causes no discoloration in the visible wavelength range.

Although nitrate is added to the glass according to the invention in the melt, preferably in the form of alkali- and/or alkaline earth nitrates and as needed zinc nitrates, the $NO_3$ concentration in the finished glass after refining amounts to only a maximum of 0.01 percent by weight and in many cases at most 0.001 percent by weight.

A preferred embodiment of the glass according to the invention contains:

| | |
|---|---|
| $SiO_2$ | 67-74% by weight |
| $B_2O_3$ | 5-10% by weight |
| $Al_2O_3$ | 3-10% by weight |
| $Li_2O$ | 0-4% by weight |

-continued

| | |
|---|---|
| Na$_2$O | 0-10% by weight |
| K$_2$O | 0-10% by weight, |
| wherein Σ Li$_2$O + Na$_2$O + K$_2$O | 0.5-10.5% by weight, |
| MgO | 0-2% by weight |
| CaO | 0-3% by weight |
| SrO | 0-3% by weight |
| BaO | 0-3% by weight |
| ZnO | 0-3% by weight, |
| wherein Σ MgO + CaO + SrO + BaO + ZnO | 0-6% by weight, |
| ZrO$_2$ | 0-3% by weight |
| CeO$_2$ | 0-1% by weight |

An additional preferred embodiment of the glass according to the invention contains:

| | |
|---|---|
| SiO$_2$ | 67-<73% by weight |
| B$_2$O$_3$ | 7-10% by weight |
| Al$_2$O$_3$ | 5.5-9% by weight |
| Li$_2$O | 0.5-2% by weight |
| wherein Σ MgO + CaO + SrO + BaO + ZnO | 0-3% by weight, |
| ZrO$_2$ | 0.5-3% by weight |

An especially preferred embodiment of the glass according to the invention contains:

| | |
|---|---|
| SiO$_2$ | 68-69% by weight |
| B$_2$O$_3$ | 9.5-9.95% by weight |
| Al$_2$O$_3$ | 5.5-6.5% by weight |
| Li$_2$O | 1.5-2.5% by weight |
| Na$_2$O | 0-4.0% by weight |
| K$_2$O | 0.5-7% by weight |
| MgO | 0.5-2% by weight |
| CaO | 0.5-1.5% by weight |
| ZrO$_2$ | 0.5-1.2% by weight |
| TiO$_2$ | 2-10% by weight |

All the foregoing compositions preferably contain the above stated amounts of Fe$_2$O$_3$ and preferably entirely free of FeO.

The present invention relates to a method of making a UV absorbing glass with little or small absorption in the visible range. A melt is made from raw material and/or scrap or waste glass, which has a composition as defined in the claims. The method according to the invention is characterized by no requirement for highly pure raw materials. The SiO$_2$ materials, which are required, can have a content of greater than 100 ppm of Fe$_2$O$_3$ and/or greater than 500 ppm, especially >600 ppm. The raw materials are chiefly used with an iron oxide content of greater than 120 ppm and/or 150 ppm. However amounts above 150 ppm or also 200 ppm can also be used in the method according to the invention. In many cases even SiO$_2$ base materials with an Fe$_2$O$_3$ content of greater than 800 ppm, especially of >1000 ppm to greater than 12000 ppm, have proven suitable. Since iron-free base materials lead to larger costs than otherwise during glass manufacture, the procedure according to the invention have not only a surprising technical effect, but also permit an especially economical manufacture of the glass.

It has been shown that an especially sharp UV-absorption edge can be adjusted by means of the method according to the invention and with the glass according to the invention. A UV blocking of up to 260 nm, especially up to 270 nm and particularly up to 300 nm, can be attained without difficulty. In an especially preferred embodiment the glass according to the invention blocks UV radiation up to 320 nm and especially up to 335 nm. A UV-absorption edge can be attained without or with minimal impairment of the absorption in the visible wavelength range by addition of TiO$_2$ by refining with As$_2$O$_3$ and TiO$_2$ according to the invention.

The glass according to the invention is especially suitable for making plate glass. The making of glass tubes by the procedure according to the invention is especially preferred. It is especially suitable to make tubes with a diameter of at least 0.5 mm, especially at least 1 mm and an upper limit of at most 2 cm, especially at most 1 cm. Especially a tube diameter of between 2 mm and 5 mm is preferred. It has proven suitable that the tubes according to the invention have a diameter of at least 0.05 mm, especially at least 0.1 mm. A diameter of at least 0.2 mm is particularly preferred. A maximum wall thickness of the tube wall amounts to at most 1 mm, wherein a wall thickness of <0.8 mm and/or <0.7 mm is especially preferred.

The glass according to the invention is especially suitable for use in gas discharge tubes, such as fluorescent lamps, and is most suitable for lighting, especially background lighting of electronic display apparatus, such as displays and LCD screens, for example mobile telephones and computer monitors. Preferred displays and screens are named flat displays, especially flat backlighting arrangements. Halogen-free light sources, for example those, which are based on discharge in noble gasses, such as argon, neon, xenon or mixture (Xenon lamps), are particularly preferred. Also Hg-containing filling gases are understandably suitable. These embodiments have proven especially environmentally friendly.

The glasses according to the invention are especially useful for fluorescence lamps with external electrodes and also for fluorescence lamps, in which the electrodes are sealed with the lamp glass and can pass through them, such as those made of KOVAR® alloys. External electrodes can, for example, be formed by an electrically conductive paste.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which:

FIG. 1b is a cross-sectional view through a miniaturized blacklighting device using the reflective base plate or support plate according to FIG. 1a;

DESCRIPTION OF PREFERRED EMBODIMENTS OF THE INVENTION

Figure 1A:
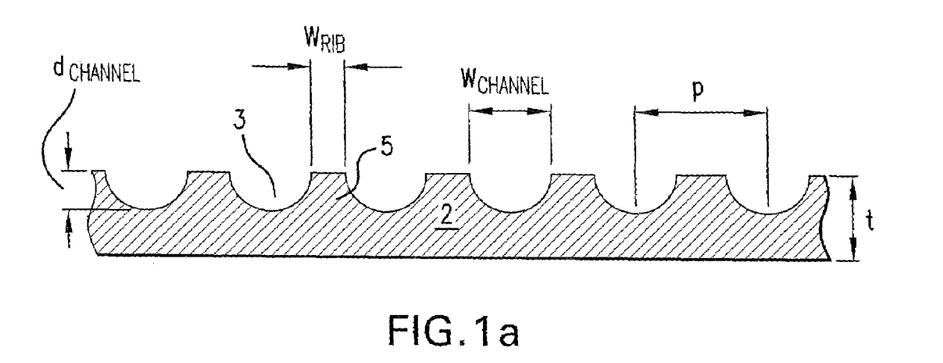
FIG. 1a is a diagrammatic cross-sectional view through a reflective base plate or support plate for a miniaturized backlighting arrangement.
Figure 1B:
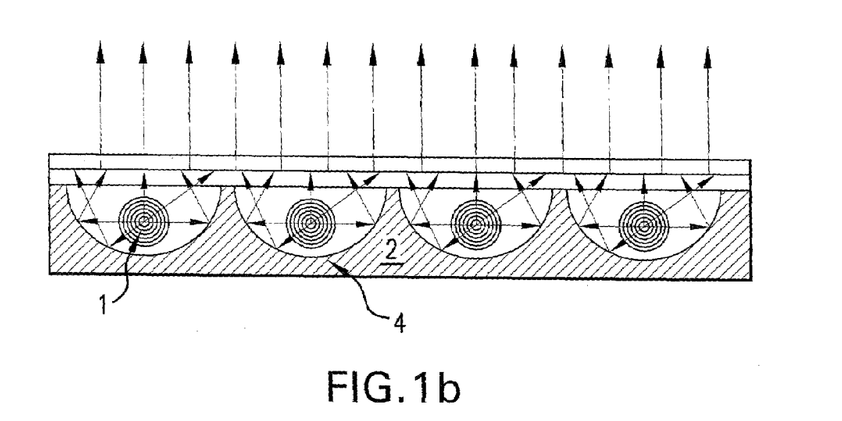

In a special embodiment, as shown for example in FIGS. 1a & 1b, the glass is used for making a low-pressure discharge lamp, especially for a backlighting arrangement. A special use is for those applications, in which individual miniaturized tubular light sources 1 are arranged parallel to each other and in recesses 3 in a plate 2, which reflects the generated light on the display. A layer 4, which scatters light uniformly and thus uniformly illuminates the display, is applied on the upper surface of the plate 2. This arrangement is provided for larger displays, for example those used for television.

Furthermore the tubular light sources 1, as shown in FIG. 1b, can be mounted outside of the display. Then the light is scattered uniformly over the display by means of a plate conducting light and serving as a light guide, as a so-called LGP (light guide plate).

Figure 2:
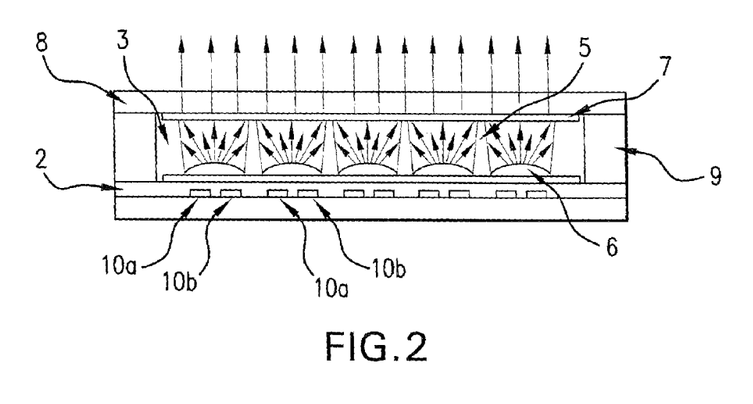
FIG. 2 is a cross-sectional view through a miniaturized display apparatus and/or backlight display with an integrated fluorescent channel.
Figure 3:
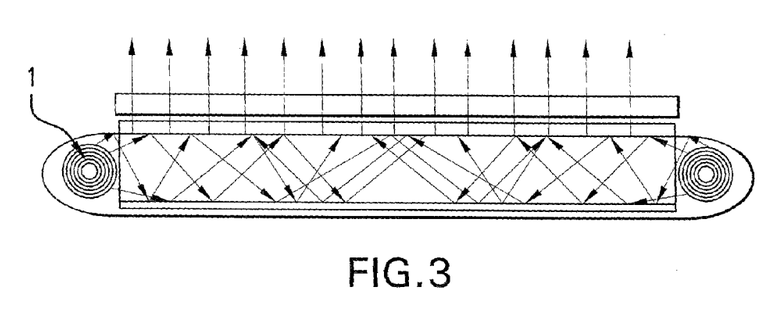
FIG. 3 is a cross-sectional view through a display device and/or backlighting device with backside illumination by laterally arranged fluorescent lights.

As shown in FIG. 2, it is also possible to use this arrangement for a backlight device, in which the light-producing means is located in a structured panel, plate or pane 2 (FIG. 1 and FIG. 2). The structuring thus takes place so that channels 3 with predetermined depth and predetermined width ($d_{channel}$ and/or $W_{channel}$) are produced in the pane 2 by means of parallel raised or elevated sections. Discharge light sources 6 are arranged in the channels. The channels 3 together with another pane 8 provided with a phosphor layer 7 form the radiating chamber. The panes themselves are sealed laterally with a seal 9 and provided with electrodes passing through them. This embodiment can be referred to as a so-called CCFL system (cold cathode fluorescent lamp), which is possible by means of outer electrodes 10a, 10b. However in principle an exterior electrical contacting is also possible, i.e. ignition of the plasma by means of an exterior electrical field (EEFL external electrode fluorescent lamp). This arrangement forms a large-area backlight and is also called a flat backlight. The panes of the flat backlight and/or the cover plate are structured according to their application or use. Both together with each other form the radiating chamber. A blank, which is obtained by rolling with a suitable structuring device, for example is pressed or stamped with a suitably structured roller, is used for making this type of structured pane, plate or panel. Furthermore the glass is heated to a temperature, at which its viscosity is suitable for this purpose, which is between the softening point and the working point of the glass. The structured pane has structures with structure depths and widths of a few tenths of millimeters (e.g. 0.1 usually 0.3 mm) to a few millimeters (e.g. 1 to 8 mm). This sort of structuring can occur by other methods of manufacture, for example, stamping, tearing, machining, chemical etching or laser ablation. The desired structures can also be obtained directly from the melt by certain hot molding or forming processes.

The glass according to the invention is especially suitable for use in gas discharge lamps, such as fluorescent lamps and is entirely especially suitable for lighting, especially background lighting of electronic display devices, such as displays and image-forming screens, the so-called flat displays, especially flat backlight arrangements. Halogen-free light sources, such as those, which are based on discharge in xenon (Xenon lamps), are especially preferred. These embodiments have proven to be especially environmentally friendly.

The glass according to the invention is also suitable for melting of alloys, especially molybdenum and/or iron-cobalt-nickel alloys. These alloys are marketed under the trade names or trademarks, KOVAR®, FERNICO or VACON® 11.

The invention is illustrated in more detail by the following examples.

EXAMPLES

The glass according to the invention was made with standard techniques and compared with glasses of the prior art. The raw materials were melted in a quartz glass vessel at a temperature of 1620° C. and refined. The absorption and/or transmission of the resulting glasses were measured.

The compositions of the individual glasses tabulated in the following table I, table II and table III are for comparison glasses V1 and V2 (table I) and glasses A1 to A15 of the invention. The glass according to the invention (tables II and III) not only has the desired hydrolytic resistance, but also outstanding UV absorption and a high transmission in the visible range.

TABLE I

GLASS COMPOSITIONS OF THE PRIOR ART

| Oxide Ingredients/ Properties | V1 | V2 |
|---|---|---|
| $SiO_2$ | 68.45 | 68.70 |
| $B_2O_3$ | 19.00 | 9.90 |
| $Al_2O_3$ | 2.55 | 6.28 |
| $Li_2O$ | 0.80 | 2.19 |
| $Na_2O$ | 0.80 | 3.14 |
| $K_2O$ | 7.70 | 1.19 |
| MgO | | 2.00 |
| CaO | | 1.00 |
| SrO | | |
| ZnO | 0.60 | |
| $ZrO_2$ | | |
| $As_2O_3$ | 0.10 | |
| $TiO_2$ | — | 4.00 |
| $CeO_2$ | — | 0.80 |
| NaCl | | 0.8 |
| $NO_3$ | | |
| Total | 100.00 | 100.00 |
| ALPHA × $10^6$ in $K^{-1}$ | 4.70 | |
| TG, ° C. | 485.00 | |
| VA | | |
| Seal Ex. Glass/glass in 8250 Standard | | |
| Seal Ex. Glass/metal Vacon 11 | | |
| Transmission Edge T < 0.1% | | |
| Hydrolytic resistance (ISO 719) | 3 | |

TABLE II

GLASS COMPOSITIONS OF THE INVENTION

| Oxide Ingredients/ Properties | A1 | A2 | A3 | A4 | A6 |
|---|---|---|---|---|---|
| $SiO_2$ | 71.00 | 72.30 | 72.10 | 72.60 | 72.60 |
| $B_2O_3$ | 10.00 | 9.90 | 9.90 | 9.90 | 9.90 |
| $Al_2O_3$ | 5.50 | 5.60 | 5.08 | 5.80 | 6.40 |
| $Li_2O$ | 2.00 | 2.00 | 2.00 | 2.00 | 2.50 |
| $Na_2O$ | 3.90 | 2.00 | | | 3.70 |
| $K_2O$ | 2.30 | 3.80 | 6.40 | 6.40 | 1.00 |
| MgO | 1.90 | 1.00 | 9.90 | 1.90 | 2.00 |
| CaO | 0.00 | 2.00 | 1.30 | 0.50 | 1.00 |
| SrO | 0.50 | | | | |
| ZnO | 2.00 | | | | |
| $ZrO_2$ | 0.80 | 0.80 | 0.80 | 0.80 | 0.80 |
| $As_2O_3$ | 0.10 | 0.10 | 0.10 | 0.10 | 0.10 |
| $TiO_2$ | — | 0.50 | 0.70 | — | 1.0 |
| $CeO_2$ | — | — | — | — | — |
| NaCl | | | | | |
| $NO_3$ | | | | | |
| $MoO_3$ | | | | 0.5 | 0.3 |
| $Bi_2O_3$ | | | | | 0.1 |
| Total | 100.00 | 100.00 | 100.00 | 100.00 | 100.00 |
| ALPHA × $10^6$ in $K^{-1}$ | 5.30 | 5.00 | 4.85 | 4.85 | 5.10 |
| TG, ° C. | 503 | 523 | 510 | 520 | 521 |
| VA, ° C. | 1088 | 1126 | 1156 | 1169 | 1102 |
| Seal Ex. Glass/glass in 8250 Standard | | | +181 nm/cm | | |

TABLE II-continued

GLASS COMPOSITIONS OF THE INVENTION

| Oxide Ingredients/ Properties | A1 | A2 | A3 | A4 | A6 |
|---|---|---|---|---|---|
| Seal Ex. Glass/metal Vacon 11 | | | | −302 nm/cm | |
| Transmission Edge T < 0.1% (layer thickness, 0.2 mm) | | 250 nm | 255 nm | | |
| Hydrolytic resistance (ISO 719) | 1 | 1 | 1 | 1 | 1 |

TABLE III

GLASS COMPOSITIONS OF THE INVENTION

| Oxide Ingredients/ Properties | A8 | A9 | A10 | A12 | A13 | A14 | A15 |
|---|---|---|---|---|---|---|---|
| $SiO_2$ | 71.80 | 68.60 | 71.80 | 67.10 | 67.34 | 67.80 | 68.80 |
| $B_2O_3$ | 9.90 | 9.90 | 9.90 | 9.90 | 9.93 | 9.90 | 9.90 |
| $Al_2O_3$ | 6.30 | 6.30 | 6.28 | 6.28 | 5.80 | 5.50 | 5.50 |
| $Li_2O$ | 2.20 | 2.20 | 2.19 | 2.19 | 2.00 | 2.00 | 2.00 |
| $Na_2O$* | 3.90 | 3.90 | 3.94 | 3.94 | | | |
| $K_2O$* | 1.20 | 1.20 | 1.19 | 1.19 | 6.37 | 5.90 | 5.90 |
| MgO | 2.00 | 2.00 | 2.00 | 2.00 | 0.89 | 1.50 | 0.50 |
| CaO | 1.00 | 1.00 | 1.00 | 1.00 | 1.27 | 1.00 | 1.00 |
| SrO | | | | | | | |
| ZnO | | | | | | | |
| $ZrO_2$ | 0.80 | 0.80 | 0.80 | 0.80 | 0.80 | 0.80 | 0.80 |
| $As_2O_3$ | 0.10 | 0.10 | 0.10 | 0.10 | 0.10 | 0.10 | 0.10 |
| $TiO_2$ | 0.80 | 4.00 | 0.80 | 5.50 | 5.50 | 5.50 | 5.50 |
| $CeO_2$ | — | — | — | — | — | | |
| NaCl | | | | | | | |
| $NO_3$ | | | | | | | |
| Total | 100.00 | 100.00 | 100.00 | 100.00 | 100.00 | 100.00 | 100.00 |
| ALPHA × $10^6$ in $K^{-1}$ | | 5.25 | | | | | |
| TG, °C. | | 522 | | | | | |
| VA, °C. | | 1077 | | | | | |
| Seal Ex. Glass/glass in 8250 Standard | | −151 | | | | | |
| Seal Ex. Glass/metal Vacon 11 | | +87 | | | | | |
| Transmission Edge T < 0.1% | 257 nm | 302 nm | 256 nm | 311 nm | 314 nm | 318 nm | 314 nm |
| Hydrolytic resistance (ISO 719) | 1 | 1 | | | | | |

*1.0% added as $NaNO_3$ and $KNO_3$ respectively

Unless otherwise stated, all percentages are percentages by weight.

The disclosure in German Patent Application 103 25 745.4 of Jun. 6, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a UV-radiation absorbing glass with high chemical resistance, especially for a fluorescent lamp, and methods of making and using same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A chemically resistant borosilicate glass with a composition comprising:

| | |
|---|---|
| $SiO_2$ | 67-74% by weight |
| $B_2O_3$ | 5-10% by weight |
| $Al_2O_3$ | 5-10% by weight |
| $Li_2O$ | 0-4% by weight |
| $Na_2O$ | 0-10% by weight |
| $K_2O$ | 0-10% by weight, |
| wherein $\Sigma Li_2O + Na_2O + K_2O$ | 0.5-10.5% by weight, |
| MgO | 0-2% by weight |
| CaO | 0-3% by weight |
| SrO | 0-3% by weight |
| BaO | 0-3% by weight |
| ZnO | 0-3% by weight, |
| wherein $\Sigma MgO + CaO + SrO + BaO + ZnO$ | 0-6% by weight, |

-continued

| | |
|---|---|
| ZrO$_2$ | 0-3% by weight |
| CeO$_2$ | 0-1% by weight |
| TiO$_2$ | 0-10% by weight |
| Bi$_2$O$_3$ | 0-10% by weight |
| MoO$_3$ | 0-10% by weight, |
| wherein Σ TiO$_2$ + Bi$_2$O$_3$ + MoO$_3$ | 0.1-10% by weight; and | wherein at least 80% by weight of titanium present in the glass has an oxidation state of +4 when said titanium is contained in the glass.

2. The chemically resistant borosilicate glass as defined in claim 1, wherein said composition includes at least 50 ppm Fe$_2$O$_3$.

3. The chemically resistant borosilicate glass as defined in claim 1, free of chloride and antimony monoxide.

4. The chemically resistant borosilicate glass as defined in claim 1, wherein

| | |
|---|---|
| SiO$_2$ | 67-<73% by weight |
| B$_2$O$_3$ | 7-10% by weight |
| Al$_2$O$_3$ | 5.5-9% by weight |
| Li$_2$O | 0.5-2% by weight |
| wherein Σ MgO + CaO + SrO + BaO + ZnO | 0-3% by weight, |
| ZrO$_2$ | 0.8-3% by weight; | and containing at least 0.06 percent by weight of said TiO$_2$ in order to adjust a position and sharpness of a UV absorption edge of the glass; and wherein at least 80 % by weight of titanium present in the glass has an oxidation state of +4.

5. The chemically resistant borosilicate glass as defined in claim 1, wherein:

| | |
|---|---|
| SiO$_2$ | 68-69% by weight |
| B$_2$O$_3$ | 9.5-9.95% by weight |
| Al$_2$O$_3$ | 5.5-6.5% by weight |
| Li$_2$O | 1.5-2.5% by weight |
| Na$_2$O | 0-4.0% by weight |
| K$_2$O | 0.5-7% by weight |
| MgO | 0.5-2% by weight |
| CaO | 0.5-1.5% by weight |
| ZrO$_2$ | 0.8-1.2% by weight |
| TiO$_2$ | 2-10% by weight; and | wherein at least 80% by weight of titanium present in the glass has an oxidation state of +4.

6. The chemically resistant borosilicate glass as defined in claim 1, wherein at least 90% by weight of said titanium present therein is in said oxidation state of +4.

7. A glass-to-metal seal comprising a molybdenum and/or cobalt-iron-nickel alloy and a chemically resistance borosilicate glass as defined in claim 1.

8. A light conducting plate comprising a glass as defined in claim 1 and consisting of a support plate or a structured plate for monitors, displays and/or gas discharge lamps with external electrodes.

9. A process for making a gas discharge lamp, a fluorescence lamp, a Xenon lamp, an LCD display, a computer monitor, a telephone display and/or an edge seal with a molybdenum or an iron-cobalt-nickel alloy, said process comprising forming a borosilicate glass according to claim 1 to make said gas discharge lamp, said fluorescence lamp, said Xenon lamp, said LCD display, said computer monitor, said telephone display and/or said edge seal with said molybdenum or said iron-cobalt-nickel alloy.

10. A process of using a borosilicate glass comprising forming a borosilicate glass according to claim 1 as a light conducting plate, a support plate or a structure plate for a monitor, display and/or a gas discharge lamp with external electrodes.

11. A method of making a neutral UV-absorbing borosilicate glass, which transmits in a visible range, said method comprising melting raw materials to form a melt and producing said melt under oxidative conditions, wherein said borosilicate glass has the following composition:

| | |
|---|---|
| SiO$_2$ | 67-74% by weight |
| B$_2$O$_3$ | 5-10% by weight |
| Al$_2$O$_3$ | 5-10% by weight |
| Li$_2$O | 0-4% by weight |
| Na$_2$O | 0-10% by weight |
| K$_2$O | 0-10% by weight, |
| wherein Σ Li$_2$O + Na$_2$O + K$_2$O | 0.5-10.5% by weight, |
| MgO | 0-2% by weight |
| CaO | 0-3% by weight |
| SrO | 0-3% by weight |
| BaO | 0-3% by weight |
| ZnO | 0-3% by weight, |
| wherein Σ MgO + CaO + SrO + BaO + ZnO | 0-6% by weight, |
| ZrO$_2$ | 0-3% by weight |
| CeO$_2$ | 0-1% by weight |
| TiO$_2$ | 0-10% by weight |
| Bi$_2$O$_3$ | 0-10% by weight |
| MoO$_3$ | 0-10% by weight, |
| wherein Σ TiO$_2$ + Bi$_2$O$_3$ + MoO$_3$ | 0.1-10% by weight; and | wherein at least 80 % by weight of titanium present in the glass has an oxidation state of +4 when said titanium is contained in the glass.

12. The method as defined in claim 11, wherein said borosilicate glass contains at least 50 ppm Fe$_2$O$_3$.

13. The method as defined in claim 11, wherein said SiO$_2$ and/or said raw material contains greater than 100 ppm Fe$_2$O$_3$.

14. The method as defined in claim 11, wherein said oxidative conditions are produced by addition of alkali nitrates and/or alkaline earth nitrates.

15. The method as defined in claim 11, wherein said melt contains up to a maximum of 6 percent by weight of alkali nitrates and/or alkaline earth nitrates in order to produce said oxidative conditions.

16. The method as defined in claim 11, wherein said melt contains up to a maximum of 100 ppm chloride.

17. A gas discharge lamp comprising chemically resistant borosilicate glass, said chemically resistant borosilicate glass having a composition comprising:

| | |
|---|---|
| SiO$_2$ | 67-74% by weight |
| B$_2$O$_3$ | 5-10% by weight |
| Al$_2$O$_3$ | 3-10% by weight |
| Li$_2$O | 0-4% by weight |
| Na$_2$O | 0-10% by weight |
| K$_2$O | 0-10% by weight, |
| wherein Σ Li$_2$O + Na$_2$O + K$_2$O | 0.5-10.5% by weight, |
| MgO | 0-2% by weight |
| CaO | 0-3% by weight |
| SrO | 0-3% by weight |
| BaO | 0-3% by weight |
| ZnO | 0-3% by weight, |
| wherein Σ MgO + CaO + SrO + BaO + ZnO | 0-6% by weight, |

| | |
|---|---|
| -continued | |
| $ZrO_2$ | 0-3% by weight |
| $CeO_2$ | 0-1% by weight |
| $TiO_2$ | 0-10% by weight |
| $Bi_2O_3$ | 0-10% by weight |
| $MoO_3$ | 0-10% by weight, |
| Wherein $\Sigma\ TiO_2 + Bi_2O_3 + MoO_3$ | 0.1-10% by weight; and | wherein at least 80% by weight of titanium present in the glass has an oxidation state of +4 when said titanium is contained in the glass.

18. The gas discharge lamp as defined in claim 17, consisting of a fluorescence lamp or a Xenon lamp.

19. A display device comprising chemically resistant borosilicate glass, said chemically resistant borosilicate glass having a composition comprising:

| | |
|---|---|
| $SiO_2$ | 67-74% by weight |
| $B_2O_3$ | 5-10% by weight |
| $Al_2O_3$ | 3-10% by weight |
| $Li_2O$ | 0-4% by weight |
| $Na_2O$ | 0-10% by weight |
| $K_2O$ | 0-10% by weight, |
| -continued | |
| wherein $\Sigma\ Li_2O + Na_2O + K_2O$ | 0.5-10.5% by weight, |
| MgO | 0-2% by weight |
| CaO | 0-3% by weight |
| SrO | 0-3% by weight |
| BaO | 0-3% by weight |
| ZnO | 0-3% by weight, |
| wherein $\Sigma\ MgO + CaO + SrO + BaO + ZnO$ | 0-6% by weight, |
| $ZrO_2$ | 0-3% by weight |
| $CeO_2$ | 0-1% by weight |
| $TiO_2$ | 0-10% by weight |
| $Bi_2O_3$ | 0-10% by weight |
| $MoO_3$ | 0-10% by weight, |
| wherein $\Sigma\ TiO_2 + Bi_2O_3 + MoO_3$ | 0.1-10% by weight; and | wherein at least 80% by weight of titanium present in the glass has an oxidation state of +4 when said titanium is contained in the glass.

20. The display device as defined in claim 19, consisting of a computer monitor, a telephone display or a liquid crystal display.

21. The chemically resistant borosilicate glass as defined in claim 1, wherein said composition includes from 0.01 to 2% by weight of $As_2O_3$.

* * * * *